Patented Jan. 5, 1954

2,665,280

UNITED STATES PATENT OFFICE 2,665,280

HALOGEN CLEAVAGE OF OZONIDES

James O. Knobloch, Hobart, and Joseph W. Sparks, Hammond, Ind., assignors to Standard Oil Company, Chicago, Ill., a corporation of Indiana No Drawing. Application December 26, 1951, Serial No. 263,516

12 Claims. (Cl. 260—340.6)

This invention relates to the cleavage of ozonides into oxygen-containing organic derivatives. More particularly, it relates to the conversion of ozonides into aldehydes and aldehyde oxidation products.

Ozonides are oxygen-containing compounds of controversial structure, which are readily formed by contacting olefins with ozone. They are unstable compounds of great reactivity, which readily undergo cleavage by oxidation, hydrogenation, or hydrolysis, according to various techniques described in the prior art. They are therefore useful as intermediates in the preparation of a variety of derivatives.

We have discovered that ozonides react exothermally with chlorine, bromine, or fluorine, and are converted thereby into aldehydes, aldehyde peroxides, and carboxylic acids.

Our new reaction cleaves the ozonide, and is believed to convert the ozonide fragments into an aldehyde and an aldehyde peroxide as two primary products. The aldehyde peroxide may subsequently rearrange to the isomeric acid. This rearrangement appears to be catalyzed by the halogen, and can be minimized by keeping the halogen concentration at a minimum. We have further discovered that the aldehyde peroxide can in effect be simultaneously isomerized into the acid and esterified by carrying out the cleavage with the halogen in the presence of a substantially anhydrous alcohol, preferably a lower alcohol which forms a homogeneous mixture under the reaction conditions.

One object of our invention is to convert olefinic and aromatic compounds into useful oxygen-containing derivatives. Another object is to convert olefin ozonides into aldehydes, aldehyde peroxides, carboxylic acids, and carboxylic-acid esters, and into halogenated derivatives thereof. Other objects of our invention will be apparent from the present description thereof.

In one embodiment of our invention, a solution of an ozonide in an inert organic solvent is commingled with a halogen of the defined class, preferably also dissolved in an inert organic solvent. The mixture is warmed, if necessary, to initiate the reaction, which ordinarily begins in about five to twenty minutes, depending upon the concentrations and proportions of the reactants, and continues usually for about ten minutes with the evolution of considerable heat. Provision should therefore be made for cooling the reaction mixture, and for condensing and refluxing the evolved vapors. After the reaction has subsided, the mixture is washed with aqueous alkali to remove free acids therefrom. The aqueous washings are acidified with a strong acid to release carboxylic acids, which are separated and subjected to purification as desired. The organic phase is stripped free from solvent and is fractionally distilled, preferably under vacuum, to separate aldehydes, aldehyde peroxides, and esters therefrom.

In another embodiment of our invention, the treatment of ozonide with cleaving agent is carried out in the presence of anhydrous alcohol, such as methanol, ethanol, n-butyl alcohol, cyclohexanol, benzyl alcohol, tetrahydrofurfuryl alcohol, or the like. Esters are produced thereby from the alcohol employed and the carboxylic acid or acids that would normally be obtained in the absence of the alcohol. In this reaction, we believe that the aldehyde peroxide is an intermediate, since we have succeeded in converting a typical aldehyde peroxide quantitatively into an ester by treatment with an alcohol and a catalytic amount of acid.

In a further embodiment of our invention, an ozonide is treated with a halogen-affording substance, such as hydrogen chloride, hydrogen bromide, hydrogen fluoride, acyl halide (other than the iodide), or the like. Free halogen is produced from such substances under the reaction conditions, presumably by ozone or ozonide oxidation or by hydrolysis followed by oxidation; and we believe that the halogen thereupon operates as the ozonide cleaving agent.

By a suitable after-treatment of our crude reaction product, we have found it possible to convert all of the products into products of a single class. For example, we can convert the entire product into carboxylic acids by oxidation under acidic conditions; or we can prepare esters from the entire product by treatment with hydrogen peroxide followed by esterification with a suitable alcohol. Other modifications will be apparent to those skilled in the art.

Our process is applicable broadly, within certain limitations, to the cleavage of ozonides of organic compounds containing an olefinic linkage. Such compounds have the structure

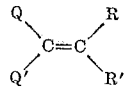

where Q, Q', R, and R' represent hydrogen or organic radicals. The organic radicals should be free from functional groups that would react with the cleaving agent. Among the suitable classes of organic radicals are hydrocarbon radicals and substituted hydrocarbon radicals such as n-alkyl, branched alkyl, cycloalkyl, aryl, carboxyalkyl, carbalkoxyalkyl, nitroalkyl, haloalkyl, and the like. Thus, the suitable class of olefinic compounds includes 1-alkenes, alkenes in which the double bond is other than terminally located, cycloalkenes, cycloalkylalkenes, arylalkenes, unsaturated aliphatic acids, unsaturated aliphatic esters, haloalkenes, nitroolefins, and the like.

Our process is also applicable to the cleavage of aromatic ozonides, such as naphthalene ozonide, anthracene ozonide, and the like.

The end result of our process is to produce a cleavage of the charging stock at the ozonized double bond therein, resulting for example in the hypothetical fragments

and

which appear in the ultimate product as aldehydes,

and

and/or the corresponding aldehyde peroxides, carboxylic acids, esters, or halogenated derivatives thereof.

Ozonides can be conveniently prepared according to techniques described in various publications, such as a study of "The Ozonization Reaction" by Long (Chemical Reviews, 27 (1940), pages 450 and 451). A convenient method is to bubble ozone through a solution of an olefin until ozone passes through unabsorbed. The ozone stream can conveniently be a stream of air or oxygen which has been treated in an electrical discharge to produce ozone therein, ordinarily in a concentration between about 2 and 8 percent. The ozone is absorbed rapidly and completely so long as any olefinic compounds remain unconverted in the charging stock. The presence of ozone in the depleted gases can conveniently be determined by passing the vent gases through a potassium iodide-starch indicator solution, the treatment with ozone being stopped as soon as the presence of ozone in the depleted gases is evidenced by the appearance of blue color in the indicator solution. Olefin ozonides are so unstable that it is unsafe to treat an undiluted olefin; it is best to employ a dilute solution of the olefin in an organic solvent which is inert to ozone and to any other materials subsequently to be employed in the process. For this purpose, a light hydrocarbon such as pentane, hexane, octane, or the like, or a halogenated hydrocarbon such as chloroform, methylene chloride, carbon tetrachloride, freon, or the like, is suitable. Ethers should not be used, since they form unstable derivatives in the presence of ozone. Ethyl ether, for example, explodes when treated with ozone.

Chlorine, bromine, and fluorine are suitable reagents for the cleavage of ozonides in our new process. Iodine is substantially inactive for the purpose, while fluorine is somewhat over-reactive and must therefore be used with caution. The reagents function in a catalytic manner, and it is therefore unnecessary to employ them in stoichiometric proportions. We have observed, in fact, that any excess of halogen over the minimum required to catalyze the cleavage reaction tends to react with the charging stock and products and to produce halogenated derivatives thereof. We ordinarily prefer to employ our cleaving reagents in a proportion between about 0.01 and 0.1 mole per mole of ozonide, unless we wish to make carboxylic acids as the major product, in which case we may employ a higher ratio up to about 1 mole per mole. The cleaving agent may be introduced into the reaction mixture as the pure material, but this is somewhat hazardous and tends to produce degradation of the reacting materials. We therefore prefer to introduce the cleaving agent as a dilute solution in an inert organic solvent, such as one of the groups set forth above, or as a minor constituent in an inert gas stream. In all cases the halogen is left in the reaction product predominantly as hydrogen halide, and can be recovered therefrom by alkali-washing or by other suitable technique.

Other suitable ozonide-cleaving reagents include substances which liberate or otherwise afford chlorine, bromine, or fluorine under the conditions employed in our process. For example, hydrogen chloride, hydrogen bromide, and hydrogen fluoride are rapidly oxidized by ozone and/or by ozonides, yielding the respective halogens. The acyl halides such as acetyl chloride, propionyl bromide, butyryl fluoride, and the like, liberate the corresponding hydrogen halides on hydrolysis with water, and the hydrogen halides are rapidly oxidized to the halogens under our reaction conditions. Other halogen-affording substances will be apparent to those skilled in the art. All such substances which require oxidation to liberate the active halogen should be used in minimum amounts, since ozone and/or ozonide is used up and destroyed in effecting the oxidation, and to such extent the charging stock is degraded.

The ozonide-cleavage reaction of our process generally begins spontaneously within a short time (around five minutes) after the reactants are mixed at ordinary temperatures. The mixture can be warmed if desired to reduce the induction period. After the reaction has started, it proceeds spontaneously owing to the large amounts of heat liberated thereby. We prefer to carry out the reaction at somewhat elevated temperatures, for example between about 50 and 100° C., conveniently at the reflux temperature of the solvent employed. The pressure employed is not critical, ambient pressures being suitable. The hydrogen-ion concentration of the reaction mixture is preferably adjusted to a level below about pK 7. The speed of reaction can be adjusted somewhat by regulating the concentrations of the reactants in the inert solvent and by regulating the ratio of cleaving agent to ozonide. In all cases, an increase of the said concentrations or of the said ratio tends to increase the rate of reaction.

Separation and recovery of the reaction products is conveniently effected by techniques well known in the art. Acidic materials are removed from the organic product phase by washing with aqueous alkali, and the acids are liberated from the wash water by acidification with a strong inorganic acid. The organic phase is stripped substantially free from solvent, and is fractionally distilled to separate aldehydes, aldehyde peroxides, esters, and other neutral organic products therefrom.

The following specific examples will more fully illustrate our invention.

Example 1

Ozonized oxygen was bubbled through a solution of 20 grams (0.178 mole) of 1-octene in 200 milliliters of carbon tetrachloride at 25° C. for 42 minutes until ozone passed through without being absorbed. To the resulting ozonide solution was added a solution of 14.2 grams (0.089 mole) of bromine in 100 milliliters of carbon tetrachloride. Ten minutes after the bromine addition, the mixture began to boil and to evolve hydrogen bromide. Four minutes later, the bromine color had disappeared and the reaction mixture had become straw-colored.

From the reaction product were recovered 23.7 grams of a crude product (about 90 percent of the available $C_7$ chain). From this material, 12.6 grams of heptanoic acid were recovered by aqueous-alkali extraction and acid regeneration (neutral equivalent: calculated, 130; found, 136; $n_D^{20}$ 1.4221, literature 1.4234). The neutral residue, weighing 7.7 grams, appeared to be a bromoheptaldehyde, $C_7H_{13}BrO$ ($n_D^{20}$ 1.4761; $d_4^{20}$ 1.306; molecular refraction: calculated, 42.36; found, 42.31).

No derivative was isolated corresponding to the small fragment arising from the cleavage of the 1-octene ozonide.

Example 2

Solutions of ozonide prepared from 11.2 grams (0.10 mole) of 1-octene in 50 to 150 milliliters of chloroform were commingled at room temperature with a range of amounts of a solution of 64 grams (0.40 mole) of bromine in 100 milliliters of chloroform. After the reaction had subsided in each case, the crude reaction product was separated into its component parts. Two major products were obtained: an acidic material that was found to be heptanoic acid, and a neutral oil that was found to be a mixture of heptaldehyde and heptaldehyde peroxide. The neutral oil was analyzed by esterification with methanol in the presence of sulfuric acid, the aldehyde peroxide being thereby converted into methyl heptanoate, and thereafter separating the ester from the heptaldehyde by distillation. The complete data from the experiments demonstrate that by operating at a sufficiently low bromine concentration, almost all of the $C_7$ product can be obtained as the neutral oil:

| Ozonide | Bromine | Heptanoic acid | Neutral oil | | |
|---|---|---|---|---|---|
| | | | Total | Aldehyde | Peroxide |
| Moles | Moles | Moles | Moles | Moles | Moles |
| 0.10 | 0.060 | 0.052 | 0.063 | | |
| 0.10 | 0.030 | 0.049 | 0.050 | 0.0076 | 0.0424 |
| 0.102 | 0.015 | 0.0273 | 0.072 | | |
| 0.102 | 0.015 | 0.050 | 0.071 | 0.025 | 0.046 |
| 0.102 | 0.015 | 0.036 | 0.074 | | |
| 0.10 | 0.0075 | 0.004 | 0.098 | 0.0343 | 0.0637 |

Example 3

A solution of 0.10 mole of 1-octadecene in 200 milliliters of chloroform was saturated with ozone at 0° C. The volume was made up to 300 milliliters with chloroform and 50 milliliters of water were floated on the surface thereof. Bromine (2.5 grams in 25 milliliters of chloroform) was then added and the mixture was allowed to stand without stirring. After about 5 minutes the reaction commenced, and the mixture boiled gently for about 10 minutes. It was allowed to stand until cold, and the water layer was separated. The chloroform layer was washed once with 50 milliliters of water, dried, and distilled to remove the chloroform, yielding 26.7 grams of crystals. The crystals were recrystallized from pentane, and were then analyzed. Melting point; literature for heptadecanoic acid, 61° C.; found, 58.2° C. Neutral equivalent: calculated, 270; found, 277. Ultimate analysis, calculated for $C_{17}H_{34}O_2$; 75.60 percent carbon, 12.60 percent hydrogen, 11.80 percent oxygen; found: 74.80 percent carbon, 12.59 percent hydrogen, 12.61 percent oxygen (by difference). These data indicate that the crystalline material was a $C_{17}$ acid with a small proportion of impurity. The yield was 98.8 percent of theory.

The water layer and water washes were combined, titrated with standard alkali, and found to contain hydrobromic acid equivalent to 2.47 grams of bromine.

Example 4

A water layer was floated on top of 100 milliliters of a chloroform solution containing 0.10 mole of 1-octadecene ozonide, and to the mixture 2.4 grams (0.015 mole) of bromine were added at room temperature. After two minutes an exothermic reaction started and the chloroform solution boiled vigorously. The reaction was allowed to go to completion. Thereafter, the reaction product was cooled and shaken with aqueous alkali, and the layers were separated. From the aqueous layer was recovered 0.011 mole of heptadecanoic acid by acidification. On evaporation of the chloroform from the organic layer, 0.086 mole of substantially pure heptadecyl aldehyde peroxide was obtained.

Example 5

A series of experiments were carried out to study the effect of the ratio of bromine to ozonide. In each experiment, 0.020 mole of 1-octadecene ozonide was diluted to 50 milliliters with chloroform, 20 milliliters of distilled water were floated on top of the chloroform solution, and the desired quantity of a solution of 1.6 grams (0.01 mole) of bromine in 100 milliliters of chloroform was added. After the reaction had gone to completion, the mixture was allowed to cool and the water layer was drawn off. The chloroform solution was washed once with 20 milliliters of distilled water. The water layer and water washings from each experiment were combined and titrated with standard alkali, and the HBr content was calculated. This was then converted to the bromine equivalent. The results were as follows:

| Experiment No. | Bromine added, moles | Ratio $Br_2$: ozonide, molar | Bromine in water layer, moles |
|---|---|---|---|
| 1 | 0.00010 | 1:200 | 0.00015 |
| 2 | 0.00020 | 1:100 | 0.00026 |
| 3 | 0.00040 | 1:50 | 0.00041 |
| 4 | 0.00080 | 1:25 | 0.00073 |
| 5 | 0.00160 | 1:12.5 | 0.00161 |

Experiments 1 and 2 required warming on a steam bath to complete the removal of the bromine color. The reaction in Experiments 3, 4,

Example 6

A solution of 20.8 grams (0.20 mole) of styrene in 260 milliliters of chloroform was saturated with ozone at 0° C. during a 110-minute period.

Half of the resulting solution (0.10 mole styrene ozonide) was diluted to 100 milliliters with chloroform and 2.4 grams (0.015 mole) of bromine in 15 milliliters of chloroform were added. After thirty-five minutes the chloroform began to boil gently. The reaction mixture was allowed to stand overnight, and was then shaken with aqueous alkali. From the resulting aqueous extract 2.72 grams (0.022 mole) of benzoic acid were recovered having a neutral equivalent of 123 (theo., 122).

The other half of the solution (0.10 mole styrene ozonide) was diluted to 150 milliliters with chloroform and 4.8 grams (0.03 mole) of bromine in 15 milliliters of chloroform were added. After sixteen minutes a reaction started, and the temperature rose slowly to the boiling point of chloroform. The reaction proceeded very slowly and was still going after 2.5 hours. The mixture was allowed to stand overnight and was then washed free of acids with aqueous alkali.

The neutral oils from both of the above reactions were combined and filtered. The filtrate was an orange syrup weighing 14.13 grams and having a strong odor of benzaldehyde. The filter cake was a white crystalline material melting at 187–188° C. From the filtrate an additional 0.38 gram of crystalline material melting at 188° C. was obtained by diluting with absolute ethanol, chilling, and adding water. Recrystallization of the combined solids raised the melting point to 199–200° C. with gas evolution at the melting point. The recrystallized solid was identified as benzaldehyde peroxide dimer, dibenzaldiperoxide,

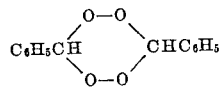

which was prepared in 1900 by Baeyer and Villiger (Ber. 33, 2487) from benzaldehyde and hydrogen peroxide. Calc. for $C_{14}H_{12}O_4$: C, 68.85; H, 4.95. Found: C, 68.79; H, 5.15. Molecular weight: Calc., 244; found, 245±5 (Menzies-Wright method in benzene). Mixed melting point: 199–200° C.

Example 7

A solution of 0.05 mole of naphthalene diozonide in chloroform was commingled with a solution of 0.0062 mole of bromine in chloroform. From the reaction product were recovered phthalic acid and phthalic aldehyde in a total yield of about 1.5 percent and a crystalline material having the same melting point (219° C.), neutral equivalent (104), and solubility characteristics as a crystalline material obtained by hydrogenating naphthalene diozonide.

Example 8

One-tenth mole of 1-octene was ozonized in 120 milliliters of chloroform at 0° C. until saturated. The chloroform was then removed in a stream of nitrogen and finally under vacuum, and the ozonide was taken up in 100 milliliters of methyl alcohol containing 2.8 grams of chlorine. The resulting solution was heated and refluxed for two hours, at the end of which time the liquid was colorless but gave a positive peroxide test. Chlorine gas was then slowly bubbled into the refluxing alcohol until a negative peroxide test was obtained, one-half hour being required. The treated solution was boiled, cooled, and poured into 600 milliliters of water. The resulting aqueous solution was extracted with ether and the aqueous phase was discarded. The ether extract was in turn washed with aqueous 10 percent sodium bicarbonate and dried over calcium sulfate; and the ether was removed in a stream of nitrogen, leaving 12.2 grams of residual liquid having a refractive index ($n_D^{20}$) of 1.4311, a density ($d_4^{20}$) of 0.982, and a saponification equivalent of 136. This material had an odor similar to methyl heptanoate, but contained 12.3 percent chlorine. Thus, it was probably a mixture of 62 percent methyl chloroheptanoate and 38 percent methyl heptanoate. Hydrolysis of part of the chlorine under the conditions employed for determining the saponification equivalent (ethylene glycol-KOH at 100° C. for one hour) would not be unexpected and would account for the low value found. The observed molecular refraction for the postulated mixture was 43.65; the calculated value for this mixture is 43.77.

Example 9

Iodine (1.3 grams) was added to an ozonide prepared from 8.0 grams of 1-octene in 200 milliliters of chloroform, and the mixture was allowed to stand for two weeks. No reaction was observed to take place.

Example 10

1-octadecene ozonide (0.050 mole) was made up to 50 milliliters with chloroform and commingled with 7.2 grams of hydrogen bromide in 100 milliliters of absolute methyl alcohol. Free bromine was liberated immediately, and the solution became warm but not colorless. It was allowed to stand overnight at room temperature, and the following morning it had become colorless and had separated into two layers. The lower layer was removed and evaporated under nitrogen, yielding 12.4 grams of a pleasant-smelling liquid which solidified at 0° C. Qualitative tests showed that this material was not an aldehyde, an acid, or an acetal. It was fractionally distilled at 4 mm. Hg, and a 33 percent fraction was separated, boiling at 156–158° C. and having a specific gravity ($d_4^{20}$) of 0.8854, an index of refraction ($n_D^{20}$) of 1.4444, and a specific molar refraction of 0.300. A second close-boiling fraction was also isolated, corresponding to 25 percent of the total liquid, having a boiling point of 174–180° C. at 4 mm. Hg, a specific gravity ($d_4^{20}$) of 0.9923, and an index of refraction ($n_D^{20}$) of 0.9923, and an index of refraction ($n_D^{20}$) of 1.4556.

Example 11

1-octene (11.2 grams, 0.10 mole) in 250 milliliters of 95 mole-percent hexane was ozonized at 0° C. for 45 minutes until ozone passed through without being absorbed. Bromine (8.0 grams, 0.05 mole) in 25 milliliters of hexane was then added. Five minutes after the bromine addition, a vigorous reaction took place, accompanied by boiling of the hexane and evolution of HBr. The bromine color disappeared after about four minutes, and the reaction mixture became straw-colored.

After the reaction mixture had stood over night, 75 milliliters of ethyl ether were added (total volume 265 milliliters) and the hexane solution was shaken with 100 milliliters of aqueous 10 percent sodium bicarbonate solution. Both layers were counterwashed.

The bicarbonate extract was evaporated to dryness, acidified, and extracted with ether. The ether solution was dried over magnesium sulfate, filtered, and evaporated in a stream of dry nitrogen. Free acid weighing 5.899 grams and having a neutral equivalent of 126 and an index of refraction ($n_D^{20}$) of 1.4177 was recovered.

The ether-hexane layer was dried over magnesium sulfate, filtered, and evaporated, and 10.758 grams of a neutral oil were obtained. The neutral oil was refluxed for four hours with 100 milliliters of aqueous 9 percent hydrochloric acid. The treated oil was washed with aqueous alkali, and from the washings were recovered 2.2 grams of free acid having an index of refraction ($n_D^{20}$) of 1.4221 (literature value for heptanoic acid, 1.4234) and a neutral equivalent of 135 (calculated for heptanoic acid, 130).

Example 12

1-octene ozonide (from 0.10 gram-mole of 1-octene ozonized to saturation in 100 milliliters of chloroform at 0° C.) was freed from solvent by evaporation in a stream of nitrogen. The ozonide was twice taken up in 50 milliliters of ether and the ether was removed in the same manner. The ozonide was finally dissolved in 100 milliliters of n-butyl alcohol and 2.4 grams (0.015 mole) of bromine in 10 milliliters of n-butyl alcohol were added. The resulting solution was refluxed three hours and distilled. Material boiling up to 114° C. was discarded. The resdue was taken up in ether and washed successively with aqueous sodium bicarbonate and water. The ether solution was dried over anhydrous magnesium sulfate and fractionally distilled through a laboratory column. The results were as follows:

| Fraction | Boiling range, °C. | Pressure, mm. | Distillate weight, g. | $n_D^{20}$ | $d_4^{20}$ |
|---|---|---|---|---|---|
| 1 | 35 | Atm. | | (Ether) | |
| 2 | 46–48 | 36.5 | 0.0029 | | |
| 3 | to 34 | 12.5 | 0.8984 | 1.4096 | |
| 4 | 34–65.5 | 12 | 2.8510 | 1.4108 | 0.849 |
| 5 | 65.5–90.5 | 12 | 2.4772 | 1.4131 | |
| 6 | 90.5–95.9 | 12 | 4.0759 | 1.4212 | 0.866 |
| 7 | 95.9–98.3 | 12 | 4.3080 | 1.4232 | 0.869 |
| 8 | 98.3–121.2 | 12 | 1.8418 | 1.4338 | 0.912 |
| 9 | Ca. 123 | 12 | 0.8259 | 1.4500 | |
| 10 | 103–114 | 3 | 0.2848 | 1.4565 | |
| 11 | 114–131 | 3 | 2.2914 | 1.4532 | |
| 12 | 131 | 3 | 0.3385 | 1.4543 | |

Dibutyl formal was indicated to be present in Fraction 4 by infrared examination and other analytical data. Fractions 6 and 7 appeared to contain n-butyl heptanoate in 45.1 percent yield, based on 1-octene charged. Molar refraction: calculated for n-butyl heptanoate, 54.65; observed, 54.61. Literature constants for n-butyl heptanoate: $n_D^{25}$, 1.4204; $d_4^{25}$, 0.8592. Calculated composition of $C_{11}H_{22}O_2$: C, 70.9; H, 11.9; found for fraction 7: C, 70.0; H, 11.6.

Example 13

1-octene (0.10 mole) was ozonized in 100 milliliters of chloroform at 0° C. until saturated. The volume of the ozonide solution was adjusted to 50 milliliters, and 1.2 grams (0.0075 mole) of bromine were added at room temperature. The bromine color disappeared immediately, and the temperature of the solution rose to 34° C., but cooled rapidly back to room temperature. The beaker was warmed on a steam bath, and a gas was evolved having a strong odor of formaldehyde. Gentle warming of the solution was continued until gas evolution had practically stopped. The solution was then diluted with 100 milliliters of ether and the acids contained therein were removed with aqueous sodium bicarbonate. Both phases were counterwashed. From the aqueous phase 0.50 gram of heptanoic acid (0.004 mole) was isolated in the usual manner. The ether-chloroform phase was dried over calcium sulfate and filtered, and the solvents were evaporated, leaving 12.7 grams of a neutral residue.

Five grams of the neutral residue was esterified with 50 milliliters of methyl alcohol and 2 milliliters of 96 percent sulfuric acid. The product so obtained had a saponification equivalent of 200 and an oxygen content of 19.3 percent. A mixture of 72 percent methyl heptanoate and 28 percent heptaldehyde would give this equivalent and would contain 19.9 percent oxygen.

When 7.0 grams of the neutral residue were similarly esterified and distilled through a small column, a 48 percent yield of methyl heptanoate was isolated and identified by infrared and other analyses. Molar refraction: calculated for $C_6H_{13}COOCH_3$, 40.80; observed, 40.76; $n_D^{20}$ 1.4124; $d_4^{20}$ 0.881; elemental analysis: calculated for $C_6H_{13}COOCH_3$, C, 66.62; H, 11.19; found, C, 66.60; H, 11.04.

While the foregoing examples illustrate certain specific embodiments of our invention, it is to be understood that we are not restricted to the charging stocks, proportions, manipulative steps, or operating conditions disclosed therein, but may practice our invention broadly within the scope of our disclosure thereof. In general, it can be said that any modifications or equivalents that would ordinarily occur to one skilled in the art are to be considered as lying within the scope of our invention.

In accordance with the foregoing description, we claim as our invention:

1. A method for cleaving an ozonide, which comprises contacting said ozonide with a reagent selected from the group consisting of fluorine, chlorine, bromine, and substances affording fluorine, chlorine, and bromine under the conditions employed in said contacting, and separating an oxygen-containing organic derivative of said ozonide from the reaction product.

2. A method for cleaving an olefin ozonide, which comprises contacting said ozonide with a reagent selected from the group consisting of fluorine, chlorine, bromine, and substances affording fluorine, chlorine, and bromine under the conditions employed in said contacting, and separating an oxygen-containing organic derivative of said ozonide from the reaction product.

3. The method of claim 2 wherein said reagent is chlorine.

4. The method of claim 2 wherein said reagent is bromine.

5. The method of claim 2 wherein said reagent is hydrogen bromide.

6. A method for cleaving an acyclic olefin ozonide, which comprises contacting said ozonide with water and a reagent selected from the group consisting of fluorine, chlorine, bromine, and substances affording fluorine, chlorine, and bromine under the conditions employed in said contacting, and separating an oxygen-containing organic derivative of said ozonide from the reaction product.

7. A method for preparing a carboxylic acid ester, which comprises contacting an olefinic ozonide with an alcohol and a reagent selected from the group consisting of fluorine, chlorine, bromine, and substances affording fluorine, chlorine, and bromine under the conditions employed in said contacting, and separating a carboxylic acid ester from the reaction product.

8. A method for preparing heptanoic acid which comprises contacting 1-octene ozonide with water and bromine, and separating heptanoic acid from the reaction product.

9. A method for preparing heptadecanoic acid which comprises contacting 1-octadecene ozonide with water and bromine, and separating heptadecanoic acid from the reaction product.

10. A method for preparing n-butyl heptanoate which comprises contacting 1-octene ozonide with n-butyl alcohol and bromine, and separating n-butyl heptanoate from the reaction product.

11. A method for preparing methyl heptadecanoate which comprises contacting 1-octadecene ozonide with methanol and hydrogen bromide, and separating methyl heptadecanoate from the reaction product.

12. A method for preparing dibenzaldiperoxide which comprises contacting styrene ozonide with bromine, and separating dibenzaldiperoxide from the reaction product.

JAMES O. KNOBLOCH.
JOSEPH W. SPARKS.

References Cited in the file of this patent

Asinger, Ber. Deut. Chem. Gesell., 75B, 656–60 (1942).